United States Patent
Takeuchi et al.

(10) Patent No.: US 6,928,837 B2
(45) Date of Patent: Aug. 16, 2005

(54) SILICA GLASS SUBSTRATES AND THEIR SELECTION

(75) Inventors: Masaki Takeuchi, Nakakubiki-gun (JP); Atsushi Watabe, Nakakubiki-gun (JP); Tetsushi Tsukamoto, Nakakubiki-gun (JP); Yukio Shibano, Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 497 days.

(21) Appl. No.: 10/026,462

(22) Filed: Dec. 27, 2001

(65) Prior Publication Data

US 2002/0078710 A1 Jun. 27, 2002

(30) Foreign Application Priority Data

Dec. 27, 2000 (JP) ........................................ 2000-397364

(51) Int. Cl.[7] .......................... C03C 15/00; C03C 19/00
(52) U.S. Cl. .............................. 65/29.18; 65/31; 65/61; 73/7
(58) Field of Search .............................. 65/29.11, 29.18, 65/31, 61; 428/542.8; 73/7

(56) References Cited

U.S. PATENT DOCUMENTS

| 4,274,907 A | 6/1981 | Vig et al. |
| H532 H | 10/1988 | Brandmayr |

FOREIGN PATENT DOCUMENTS

| EP | 0 629 588 A1 | * 12/1994 |
| JP | 11335140 A | 12/1999 |
| JP | 2000302482 A | 10/2000 |

OTHER PUBLICATIONS

Machine Translation of JP 2000–302482 prepared at http://www.ipdl.jpo.go.jp.*
Takeuchi et al. "Properties of our developing next generation photomask substrate" Database accession No. 6584331, abstract. Photomask and X–Ray Mask technology VI, Yokohama, Japan, Apr. 13–14, 1999, vol. 3748, pp. 41–52.
Phase Shift Mask Fabrication Using Reactive Ion Etching of Quartz Substrates Research Disclosure, Kenneth Mason Publications, Hampshire, GB, No. 340, Aug. 1, 1992, p. 682. abstract.

* cited by examiner

Primary Examiner—Sean Vincent
(74) Attorney, Agent, or Firm—Millen White Zelano & Branigan, P.C.

(57) ABSTRACT

A silica glass substrate is obtained by polishing, cleaning, drying and etching a silica glass substrate slice. When the substrate on one surface is treated with a reactive reagent, defects having a size of at least 0.3 μm in a direction parallel to the substrate major surface are absent on the substrate surface. The silica glass substrate, in which no submicron defects manifest on the substrate surface even when treated as by cleaning or etching, serves as a reticle for use in photolithographic IC fabrication, achieving an improved manufacturing yield in the semiconductor device fabrication and microelectronic system fields.

12 Claims, 1 Drawing Sheet

SILICA GLASS SUBSTRATES AND THEIR SELECTION

This invention relates to silica glass substrates for use as the reticle belonging to the most advanced application among semiconductor-related electronic materials, expected to find spreading application in the microelectronics and microanalysis fields, and also for use as silica glass chips, and a method for selecting silica glass substrates.

BACKGROUND OF THE INVENTION

Quality requirements of reticle-forming silica glass substrates include the size and density of defects on substrates, the flatness and surface roughness of substrates, the photochemical stability of material, and the chemical stability of surface. Of these, the quality requirements concerning the on-substrate defects become more stringent on account of the recent trend toward further miniaturization of integrated circuits.

The defective quality of reticle-forming silica glass substrates has been gradually improved. Currently, substrates in which concave defects with a size of less than about 0.3 $\mu$m are present are used. This is because the visual inspection under a collective lamp at a sufficient illuminance to avoid any hygienic problem and the defective inspection by an automatic defect detecting system have the technical limit that concave defects such as flaws are less sensitive than convex defects such as particles, and the probability to detect concave defects with a size of less than about 0.3 $\mu$m is very low. This inspection limit caused a delay in devising substrate quality improvements.

Even in the substrates in which concave defects with a size of less than about 0.3 $\mu$m are apparently absent, chemical reagents used in cleaning and otherwise processing steps can cause enlargement of ultrafine concave defects and release of residual strains, giving rise to the problem that latent damages manifest themselves as defects.

In the case of phase shift masks which are expected to become predominant in the next generation technology, the step of positively etching the silica glass surface is involved. It is problematic if latent damages on the substrate surface manifest themselves during the step.

No substantial attention has been paid to the latent damages in quartz substrates which manifest themselves under the action of reactive reagents. Heretofore, polished substrates are regarded acceptable if no defects are found on the substrate surface. This is one of factors that make indefinite the cause for a substantial rejection rate of reticles.

SUMMARY OF THE INVENTION

An object of the invention is to provide a silica glass substrate in which latent damages do not manifest themselves under the action of reactive reagents and concave defects having a size of at least 0.3 $\mu$m are absent. Another object of the invention is to provide a method of selecting such silica glass substrates.

Using a silica glass substrate which is obtained by polishing a silica glass substrate slice, cleaning and etching, preferably to a depth of 0.2 to 0.5 $\mu$m in a thickness direction, and in which when treated with a reactive reagent, defects having a size of at least 0.3 $\mu$m in a direction parallel to the substrate major surface are absent on the substrate surface, the yield of semiconductor device manufacture and microelectronic system fabrication is improved.

The invention provides a silica glass substrate obtained by polishing, cleaning, drying and etching a silica glass substrate slice. The substrate has a pair of major surfaces and a thickness therebetween. When the substrate is treated with a reactive reagent, defects having a size of at least 0.3 $\mu$m in a direction parallel to the substrate major surface are absent on the substrate surface.

Preferably, in the etching step, the silica glass substrate slice is etched away in an amount of 0.2 to 0.5 $\mu$m in a thickness direction thereof. The reactive reagent is typically an acidic or alkaline reagent.

Another aspect of the invention provides a method for selecting silica glass substrates, comprising the steps of polishing, cleaning, drying and etching silica glass substrate slices to form silica glass substrates, and inspecting the substrates for surface defects, thereby selecting those substrates on a surface of which defects having a size of at least 0.3 $\mu$m in a direction parallel to the substrate major surface are absent.

BRIEF DESCRIPTION OF THE DRAWING

The only FIGURE.

DESCRIPTION OF THE PREFERRED EMBODIMENT

Figure 1:
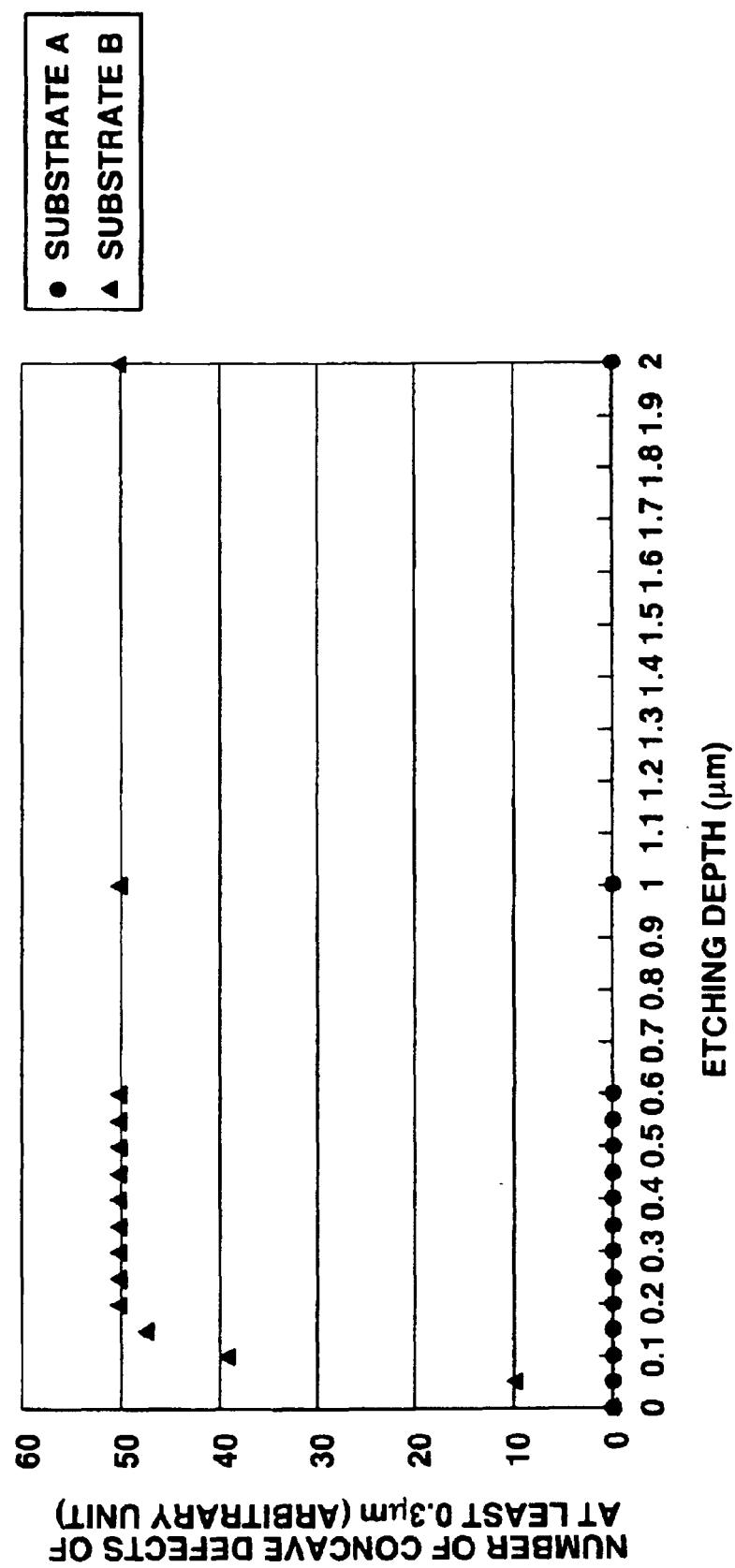
FIG. 1 is a graph showing the number of concave defects versus etching depth.

Silica glass substrates are generally manufactured by forming a quartz glass ingot in a conventional manner, shaping and annealing the ingot, slicing the ingot into slices, effecting rough polishing on the slices, then effecting precision polishing that determines the final surface quality. In the precision polishing step, abrasive cloth and polishing compound are selected so as to give a desired finish surface. This is followed by cleaning, drying and etching, thereby completing silica glass substrates. The invention requires that when the substrate is treated with a reactive reagent, defects having a size of at least 0.3 $\mu$m in a direction parallel to the substrate major surface be absent on the substrate surface.

In the above process of manufacturing silica glass substrates, use of only the precise polishing step, even when a desired finish surface is arrived at by using an appropriate combination of abrasive cloth and polishing compound, results in silica glass substrates with a certain probability of involving latent damages which will manifest themselves in the subsequent step of cleaning or etching.

Then the present invention selects those substrates in which defects with a size of at least 0.3 $\mu$m are not found on microscopic inspection after the finish surface is subjected to etching for causing latent damages, if any, to be manifested. That is, latent damage-free substrates are selected. This is because those silica glass substrates which have not manifested defects upon etching do generate no defects during the subsequent cleaning or etching step.

Any desired chemical may be used for the etching treatment of the finish surface as long as it is reactive with silica glass. The preferred chemicals include fluoride ion-containing compounds such as conc. hydrofluoric acid, diluted hydrofluoric acid and buffered hydrofluoric acid. The chemical solution may contain a surfactant and a reaction control reagent. The chemical solution is preferably used under such conditions that uniform etching proceeds at an appropriate rate.

In one example, substrates were immersed in hydrofluoric acid. In the diagram of FIG. 1, the number of concave defects having a size of at least 0.3 $\mu$m is plotted as a function of an etching depth ($\mu$m). The number of manifesting defects was saturated if immersion treatment was carried out so as to provide an etching depth of 0.2 μm or greater. For the substrate in which no defects manifested in the immersion treatment, further etching treatment with hydrofluoric acid does not cause defects to manifest (see data of substrate A in FIG. 1). Inversely, when substrates are etched to a depth of less than 0.2 μm at which the number of manifesting defects has not been saturated, there is an increased probability of wrongly judging that the substrates are latent damage-free substrates (see data of substrate B in FIG. 1). It is noted that the etching depth in FIG. 1 is the depth of material etched away with the etching chemical combined with the depth of material removed with the reactive reagent to be described later.

In either case, if the etching depth is more than 0.5 μm, no problem arises in theory, but the chemical solution used therefor runs to waste in a substantial sense and sometimes gives rise to extra problems such as the difficulty of uniform etching and surface roughening. Therefore, the etching depth of silica glass substrate is preferably in the range of 0.2 μm to 0.5 μm.

In the context of the invention, the defects that manifest when a silica glass substrate obtained by polishing, cleaning and etching a silica glass substrate slice is treated with a reactive reagent are defined as having a size of at least 0.3 μm in a direction parallel to the substrate major surface. This size is dependent on the detection ability of the existing defect inspection technique. It is readily understood that even when an inspection technique with a higher sensitivity is employed, the inventive method can comply with finer defects or latent damages by reconsidering the etching conditions.

The reactive reagent used herein includes acidic and alkaline chemicals used in cleaning and etching steps. Acidic reagents include fluoride ion-containing compounds such as hydrofluoric acid, buffered hydrofluoric acid, ammonium fluoride, ammonium monohydrogen difluoride, and borofluoric acid, as well as sulfuric acid, nitric acid, hydrochloric acid, acetic acid, citric acid, malic acid, oxalic acid, and perchloric acid, with the fluoride ion-containing compounds being especially preferred. Alkaline reagents include sodium hydroxide, potassium hydroxide, calcium hydroxide, ammonia and amines. Also included in the reactive reagent are the foregoing acidic or alkaline reagents in combination with a surfactant such as sodium alkylbenzenesulfonate, polyoxyethylene alkyl ether hydrogen sulfate or dioctylsulfosuccinate or a chelating agent such as sodium tripolyphosphate, sodium pyrophosphate, zeolite or sodium ethylenediamine tetraacetate. Further included are gases of carbon tetrafluoride, methane trifluoride, sulfur hexafluoride and hydrogen fluoride used in gas phase etching, known as dry etching.

It is noted that concave defects present on the substrate surface can be found by scanning the entire substrate surface under a microscope such as a stereomicroscope, and their shape and size be determined using an atomic force microscope. This inspection technique is capable of detecting concave defects with a size of at least 0.3 μm (see Japanese Patent No. 2,705,764).

EXAMPLE

Examples of the invention and comparative examples are given below by way of illustration, and not by way of limitation. The parameters used in the examples are not intended to restrict the scope of the invention.

Example 1

A quartz glass ingot shaped and annealed was sliced into 50 silica glass substrate slices having a diameter of 6 inches. After lapping and rough polishing, the slices proceeded to final precision polishing. Using abrasive cloth of suede type and a slurry of abrasive grains with a diameter of several tens of nanometers as the polishing slurry, polishing was done batchwise on either surface. The polishing step was followed by cleaning and drying. The slices were etched with a 1% aqueous hydrofluoric acid solution to a depth of 0.3 μm in a thickness direction. By scanning the entire surface of the resulting substrates under a stereomicroscope, forty five (45) substrates free of concave defects were picked up.

The 45 defect-free substrates thus selected were treated with a 10% aqueous hydrofluoric acid solution for 10 minutes whereupon it was examined whether or not defects manifested. Upon inspection of these substrates under a stereomicroscope, defects manifested in none of the 45 substrates (rejection rate 0%).

Comparative Example 1

Forty five (45) silica glass substrate slices having a diameter of 6 inches produced as above were subjected to lapping and rough polishing, then to final precision polishing. Using abrasive cloth of suede type and a slurry of abrasive grains with a diameter of several tens of nanometers as the polishing slurry, polishing was done batchwise on either surface. The polishing step was followed by cleaning and drying. Without etching with a 1% aqueous hydrofluoric acid solution as in Example 1, the 45 substrates were examined whether or not defects manifested by treatment with a 10% aqueous hydrofluoric acid solution. Upon inspection of the substrates under a stereomicroscope, defects manifested in five of the 45 substrates (rejection rate 11%).

There have been described silica glass substrates which are advantageous for use as the reticle in the photolithographic process for the fabrication of integrated circuits in that fine defects with a size of 0.3 μm or greater do not manifest on the substrate surface even when processed as by cleaning and etching, so that the yield of semiconductor device manufacture and microelectronic system fabrication is improved.

Japanese Patent Application No. 2000-397364 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for selecting a silica glass substrate, comprising polishing, cleaning, and drying silica glass slices, etching the silica glass slices to manifest potential defects on the entirety of the major surfaces of the slices so that the number of manifesting defects saturates the major surfaces, inspecting the entirety of the major surfaces of the slices for surface defects under a stereomicroscope, and selecting, as the substrate, those slices absent surface defects of a size of at least 0.3 μm in a direction parallel to the substrate's major surfaces.

2. A method according to claim 1, wherein the etching of the slice removes a thickness of 0.2–0.5 μm.

3. A method according to claim 1, wherein the cleaning, etching or both comprises providing a reactive reagent.

4. A method according to claim 3, wherein the etching comprises providing a reactive reagent, which comprises a fluoride ion-containing compound.

5. A method according to claim 3, wherein the etching comprises providing a reactive reagent, which comprises a concentrated, diluted, or buffered hydrofluoric acid.

6. A method according to claim 3, wherein the etching comprises providing a reactive reagent, which comprises a solution, comprising a surfactant and a reaction control agent.

7. A method according to claim 3, wherein the reactive reagent is an acidic or an alkaline chemical.

8. A method according to claim 7, wherein the reactive reagent is hydrofluoric acid, a buffered hydrofluoric acid, ammonium fluoride, ammonium monohydrogen difluoride, borofluoric acid, sulfuric acid, nitric acid, hydrochloric acid, acetic acid, citric acid, malic acid, oxalic acid, or perchloric acid.

9. A method according to claim 7, wherein the reactive reagent is sodium hydroxide, potassium hydroxide, calcium hydroxide, ammonia or an amine.

10. A method according to claim 3, wherein the reactive reagent is carbon tetrafluoride, methane trifluoride, sulfur hexafluoride or hydrogen fluoride.

11. A method according to claim 1, wherein the etching of the slice removes a thickness of 0.3 $\mu$m.

12. A method according to claim 1, wherein each of the slices have a diameter of six inches.

* * * * *